United States Patent
Rhee et al.

(10) Patent No.: US 9,001,129 B2
(45) Date of Patent: Apr. 7, 2015

(54) PROCESSING APPARATUS AND METHOD FOR CREATING AVATAR

(75) Inventors: Taehyun Rhee, Yongin-si (KR); Inwoo Ha, Seoul (KR); Dokyoon Kim, Seongnam-si (KR); Xiaolin Wei, College Station, TX (US); Jinxiang Chai, College Station, TX (US); Huajun Liu, College Station, TX (US)

(73) Assignees: Samsung Electronics Co., Ltd., Suwon-si (KR); Texas A&M University System, College Station, TX (US)

( * ) Notice: Subject to any disclaimer, the term of this patent is extended or adjusted under 35 U.S.C. 154(b) by 536 days.

(21) Appl. No.: 13/276,767

(22) Filed: Oct. 19, 2011

(65) Prior Publication Data

US 2012/0127164 A1    May 24, 2012

Related U.S. Application Data

(60) Provisional application No. 61/394,884, filed on Oct. 20, 2010.

(30) Foreign Application Priority Data

Nov. 4, 2010    (KR) .................. 10-2010-0109294

(51) Int. Cl.
G06T 13/40 (2011.01)
G06T 17/00 (2006.01)

(52) U.S. Cl.
CPC ...................................... G06T 17/00 (2013.01)

(58) Field of Classification Search
CPC ........... G06T 7/20; G06T 13/00; G06T 10/44; G06F 3/011
See application file for complete search history.

(56) References Cited

U.S. PATENT DOCUMENTS

| 7,492,268 | B2 | 2/2009 | Ferguson et al. |
| 7,661,200 | B2 | 2/2010 | Bonnet et al. |
| 2009/0183550 | A1 | 7/2009 | Valasek et al. |
| 2010/0182260 | A1 | 7/2010 | Kiyuna |
| 2010/0191124 | A1 | 7/2010 | Prokoski |

FOREIGN PATENT DOCUMENTS

| EP | 2 046 029 A2 | 4/2009 |
| EP | 2 085 817 A2 | 8/2009 |
| JP | 2009-522559 | 6/2009 |

OTHER PUBLICATIONS

Jinxiang Chai, Jessica K. Hodgins, "Constraint-based Motion Optimization Using a Statistical Dynamic Model", Jul. 2007, ACM, ACM Transactions on Graphics, vol. 26, No. 3, Article 8.*

(Continued)

*Primary Examiner* — Ulka Chauhan
*Assistant Examiner* — Robert Bader
(74) *Attorney, Agent, or Firm* — NSIP Law (57) ABSTRACT

A processing apparatus for creating an avatar is provided. The processing apparatus calculates skeleton sizes of joints of the avatar and local coordinates corresponding to sensors attached to a target user, by minimizing a sum of a difference function and a skeleton prior function, the difference function representing a difference between a forward kinematics function regarding the joints with respect to reference poses of the target user and positions of the sensors, and the skeleton prior function based on statistics of skeleton sizes with respect to reference poses of a plurality of users.

19 Claims, 4 Drawing Sheets

(56) References Cited

OTHER PUBLICATIONS

Jinxiang Chai, Jessica K. Hodgins, "Performance Animation from Low-dimensional Control Signals", Jul. 2005, ACM, ACM Transactions on Graphics, vol. 24, Issue 3, pp. 686-696.*

Huajun Liu, Xiaolin Wei, Inwoo Ha, Jinxiang Chai, Taehyun Rhee, "Realtime Human Motion Control with a Small Number of Intertial Sensors", Feb. 20, 2011, ACM, I3D '11 Symposium on Interactive 3D Graphics and Games, pp. 133-140.*

Yen-Lin Chen, Jinxiang Chai, "3D Reconstruction of Human Motion and Skeleton from Uncalibrated Monocular Video", Sep. 27, 2009, Springer, Computer Vision—ACCV 2009: $9^{th}$ Asian Conference on Computer Vision, Xi'an, Sep. 23-27, 2009, Revised Selected Papers, Part I, pp. 71-82.*

* cited by examiner

PROCESSING APPARATUS AND METHOD FOR CREATING AVATAR

CROSS-REFERENCE TO RELATED APPLICATIONS

This application claims priority benefit of U.S. Provisional Application No. 61/394,884 filed on Oct. 20, 2010 in the U.S. Patent and Trademark Office, the disclosure of which is incorporated herein by reference. This application claims the priority benefit of Korean Patent Application No. 10-2010-0109294, filed on Nov. 4, 2010, in the Korean Intellectual Property Office, the disclosure of which is incorporated herein by reference.

BACKGROUND

1. Field

Embodiments of the following description relate to a processing apparatus and method for creating an avatar.

2. Description of the Related Art

In various fields related to a video game, a movie, a computer graphic (CG), and the like, a recent technology has been developed to sense a motion of a target object in a real world and translate the motion into a motion in a 3-dimensional (3D) space.

To realize the motion of the target object, for example a person, in the 3D space, various sensors may be necessary to sense a motion of the person. As more sensors are attached to a body of the person, the motion of the person can be realized more accurately.

However, an increase in the number of sensors may hinder the person from moving smoothly while also complicating attaching and detaching of the sensors. Also, since every person would have a different figure and different sensor attachment positions and directions, consistency of the measurement result may be reduced. Accordingly, there is a demand for a method for generating an accurate pose in consideration of variation in a figure of a user, a sensor attachment position, and the like, while minimizing a number of sensors to be attached to the user.

SUMMARY

According to aspects of one or more embodiments, there is provided a processing apparatus for creating an avatar, including a skeleton database to store statistics of skeleton sizes with respect to reference poses of a plurality of users; a function determination unit to determine a difference function representing a difference between a forward kinematics function, the forward kinematics function regarding joints of the avatar with respect to a reference pose of a target user, and positions of sensors attached to the target user, and to determine a skeleton prior function based on the statistics of the skeleton sizes with respect to the reference poses of the plurality of users; a calculation unit to calculate skeleton sizes of the joints of the avatar, and local coordinates corresponding to the sensors using at least one processor; and a display unit to display the avatar based on the calculated skeleton sizes of the joints and the calculated local coordinates.

The skeleton prior function may include a mean, an eigen vector, and an eigen value calculated from the statistics of the skeleton sizes with respect to the reference poses of the plurality of users.

The calculation unit may calculate the skeleton sizes of the joints of the avatar and the local coordinates corresponding to the sensors, the skeleton sizes and the local coordinates to minimize a sum of the difference function and the skeleton prior function.

The processing apparatus may further include a preprocessing unit to define the reference pose and to store information containing the statistics of the skeleton sizes of the reference poses of the plurality of users, in the skeleton database.

The processing apparatus may further include an interface unit to receive information on the positions of the sensors attached to the target user from the sensors.

The processing apparatus periodically updates the stored skeleton sizes according to changes of the reference poses.

The processing apparatus non-periodically updates the stored skeleton sizes according to changes of the reference poses.

The sensors of the processing apparatus may be provided in five positions consisting of the forehead, both wrists, a chest, and a waist.

According to one or more embodiments, there is provided a processing apparatus for creating an avatar including a function determination unit to determine a difference function representing a difference between a forward kinematics function, the forward kinematics function regarding joints of the avatar corresponding to a reference pose of a target user, and positions of sensors attached to the target user, and to determine a skeleton prior function based on statistics of skeleton sizes corresponding to reference poses of a plurality of users; a calculation unit to calculate skeleton sizes of the joints of the avatar, and local coordinates corresponding to the sensors using at least one processor; and a display unit to display the avatar based on the calculated skeleton sizes of the joints and the calculated local coordinates.

The skeleton sizes and the local coordinates may be calculated to minimize a sum of the difference function and the skeleton prior function.

According to one or more embodiments, there is provided a processing method for creating an avatar, including maintaining a skeleton database storing statistics of skeleton sizes with respect to reference poses of a plurality of users; determining a difference function representing a difference between a forward kinematics function regarding joints of an avatar with respect to a reference pose of a target user and positions of sensors attached to the target user; determining a skeleton prior function based on the statistics of the skeleton sizes with respect to the reference poses of the plurality of users; calculating skeleton sizes of the joints of the avatar and local coordinates corresponding to the sensors, using the difference function and the skeleton prior function using at least one processor; and displaying the avatar based on the calculated sizes of the joints of the avatar and the calculated local coordinates.

The skeleton prior function may include a mean, an eigen vector, and an eigen value calculated from the statistics of the skeleton sizes with respect to the reference poses of the plurality of users.

In the calculating of the skeleton sizes of the joints of the avatar and the local coordinates corresponding to the sensors, the skeleton sizes and the local coordinates may be calculated to minimize a sum of the difference function and the skeleton prior function.

The processing method may further include defining the reference poses; and storing information containing the statistics of the skeleton sizes with respect to the reference poses of the plurality of users, in the skeleton database.

The processing method may further include receiving information on positions of the sensors attached to the target user from the sensors.

According to one or more embodiments, there is provided a process for creating an avatar including determining a difference function representing a difference between a forward kinematics function regarding joints of the avatar corresponding to a reference pose of a target user and positions of sensors attached to the target user; determining a skeleton prior function based on statistics of skeleton sizes corresponding to reference poses of a plurality of users; calculating skeleton sizes of the joints of the avatar and local coordinates corresponding to the sensors, using the difference function and the skeleton prior function using at least one processor; and displaying the avatar based on the calculated sizes of the joints of the avatar and the calculated local coordinates.

The skeleton sizes and the local coordinates may be calculated to minimize a sum of the difference function and the skeleton prior function.

According to another aspect of one or more embodiments, there is provided at least one non-transitory computer readable medium storing computer readable instructions to implement methods of one or more embodiments.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Reference will now be made in detail to embodiments, examples of which are illustrated in the accompanying drawings, wherein like reference numerals refer to the like elements throughout. Embodiments are described below to explain the present disclosure by referring to the figures.

Figure 1:
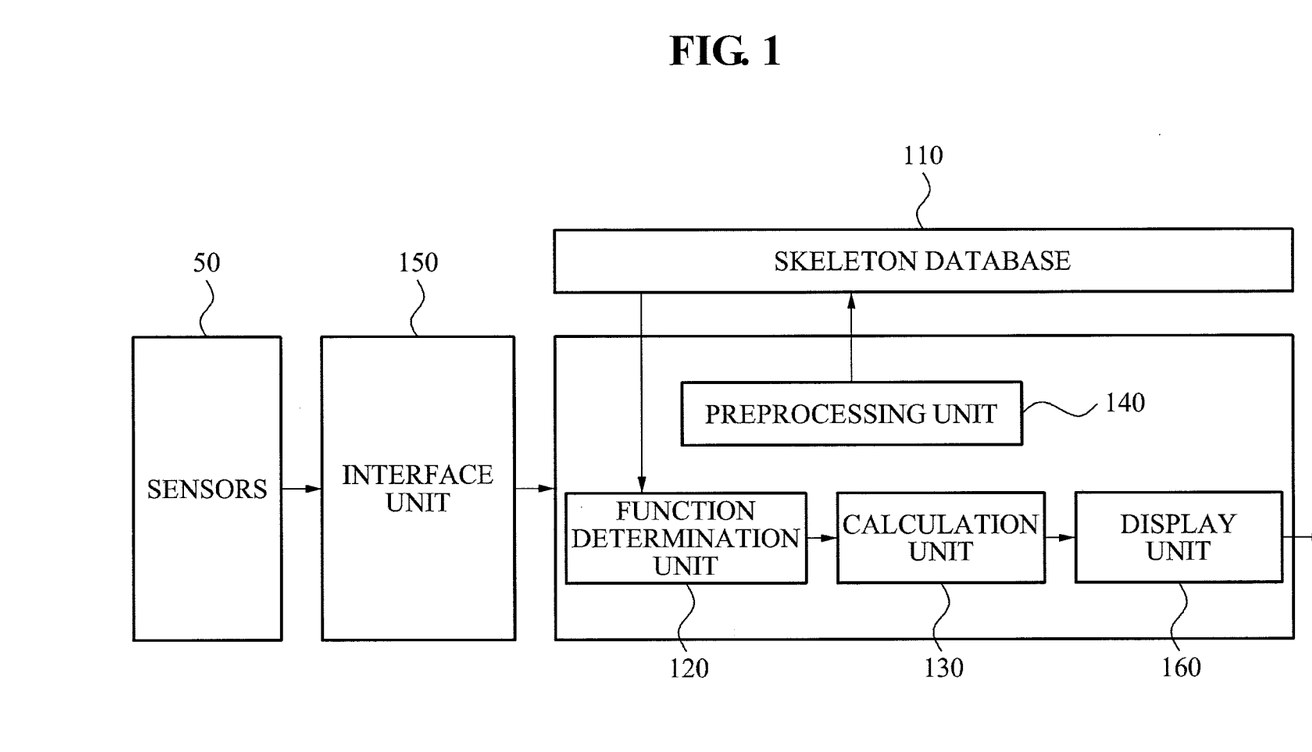
FIG. 1 illustrates a block diagram of a processing apparatus for creating an avatar, according to one or more embodiments.

FIG. 1 illustrates a block diagram of a processing apparatus for creating an avatar, according to one or more embodiments.

Referring to FIG. 1, the processing apparatus may include a skeleton database 110, a function determination unit 120, and a calculation unit 130. Additionally, the processing apparatus may include sensors 50, a preprocessing unit 140, and an interface unit 150.

The sensors 50 may be attached to a body of a target user, that is, an object corresponding to the avatar to be created, so as to sense a pose of the target user. Motion sensors and other functionally similar sensors may be used as the sensors 50.

When excessive sensors 50 are attached to the target user, efficiency of motions of the target user and attaching and detaching efficiency of the sensors may be reduced. Considering this, five sensors may be attached as shown in FIG. 2B according to one or more embodiments. Sensor attachment positions on the body of the target user and a shape of the avatar created according to reference poses will be described in detail with reference to FIGS. 2A and 2B.

The skeleton database 110 may store information including statistics of skeleton sizes with respect to (corresponding to or reflecting) reference poses of a plurality of users. The statistics of the skeleton sizes, stored in the skeleton database 110, may be updated periodically or non-periodically according to changes of the reference poses.

For example, the reference poses may include a T-shaped pose with both arms laterally stretched, an inverse-L-shaped pose with both arms stretched forward, a boxing pose, a walking pose, a running pose, and the like. Besides the above, various other poses may be defined as the reference poses.

The function determination unit 120 may determine a difference function representing a difference between a forward kinematics function regarding respective joints of the avatar with respect to a reference pose of a target user, and positions of sensors attached to the target user. In addition, the function determination unit 120 may determine a skeleton prior function based on the statistics of the skeleton sizes with respect to the reference poses of the plurality of users.

The functions determined by the function determination unit 120 will be described in further detail with reference to Equation 1 hereinafter.

Here, the forward kinematics refer to a kinematics animation method that expresses motions based on position, speed, and acceleration of a 3-dimensional (3D) object, without regard to a force of generating the motions of the 3D object.

The forward kinematics method determines the positions of all parts of the 3D object based on joint angles of all joints. Therefore, motions and a final position of a model, for example the avatar, may be determined by setting the joint angles of all the joints in advance. According to the forward kinematics method, optimum positions of all the parts of the 3D object may be found through several attempts of trial and error.

Thus, the forward kinematics function regarding the joints of the avatar with respect to the reference pose of the target user may indicate the positions of the joints of the avatar with respect to the reference pose in a 3D space.

The calculation unit 130 may calculate the skeleton sizes of the joints of the avatar and local coordinates corresponding to the sensors 50, using the difference function and the skeleton prior function.

Also, the calculation unit 130 may calculate the skeleton sizes and the local coordinates so that a sum of the difference function and the skeleton prior function is minimized.

The calculation unit 130 may perform the calculation using Equation 1 below.

$$\mathrm{argmin}_{s,z,\lambda_n} \|f(s,z;\tilde{q}_t) - \tilde{c}_t\|^2 + \left\| s - e_0 - \sum_{n=1}^{B} \lambda_n e_n \right\| \quad \text{[Equation 1]}$$

wherein, the difference function ($\|f(s,z;\tilde{q}_t) - \tilde{c}_t\|^2$) represents the difference between the forward kinematics function ($f(s,z;\tilde{q}_t)$), the forward kinematics function regarding the joints of the avatar with respect to the reference pose of the target user, and the positions ($\tilde{c}_t$) of the sensors 50 attached to the target user.

In the forward kinematics function, s denotes the skeleton size of the reference pose of the target user, z denotes the local coordinate of the sensor, and $\tilde{q}_t$ denotes the joint angle with respect to the reference pose of the target user.

The skeleton prior function $$\left( \left\| s - e_0 - \sum_{n=1}^{B} \lambda_n e_n \right\| \right)$$

is calculated based on the statistics of the skeleton sizes with respect to the reference poses of the plurality of users.

The skeleton prior function may include a mean $e_0$, an eigen vector $e_n$, and an eigen value $\lambda_n$ calculated from the statistics of the skeleton sizes with respect to the reference poses of the plurality of users. B denotes a number of main eigen vectors among the eigen vectors $e_n$ arranged in order of importance.

The skeleton prior function may be calculated and stored in a database in advance, and may be used to reduce ambiguity in the skeleton size according to the user.

To calculate the mean $e_0$, the eigen vector $e_n$, and the eigen value $\lambda_n$ from the statistics of the skeleton sizes with respect to the reference poses of the plurality of users, the skeleton prior function may use a principal component analysis (PCA) scheme.

The PCA scheme is used in statistics to analyze a set of data. According to the PCA scheme, when each data is mapped to one axis, an axis having a greatest distribution becomes a first coordinate axis, an axis having a second greatest distribution becomes a second coordinate axis, and so forth, in the same manner. Thus, linear conversion of the data is achieved on a new coordinate system.

The PCA scheme may be the optimum linear conversion method to preserve a subspace having the greatest distribution. Different from other linear conversion methods, a basis vector of the PCA is not fixed but may be varied according to characteristics of the data. Thus, the PCA may be applied in various manners by disposing a most principal component on each axis.

As can be understood from Equation 1, by energy minimization, the calculation unit 130 may calculate the skeleton sizes (s) of the joints of the avatar and the local coordinates ($\tilde{q}_r$) corresponding to the sensors for minimizing the sum of the difference function and the skeleton prior function.

The preprocessing unit 140 may define the reference pose, and store the information including the statistics of the skeleton sizes with respect to the reference sizes of the plurality of users in the skeleton database 110.

The interface unit 150 may receive information on positions of the sensors 50 attached to the target user, from the sensors 50.

Figure 2A:
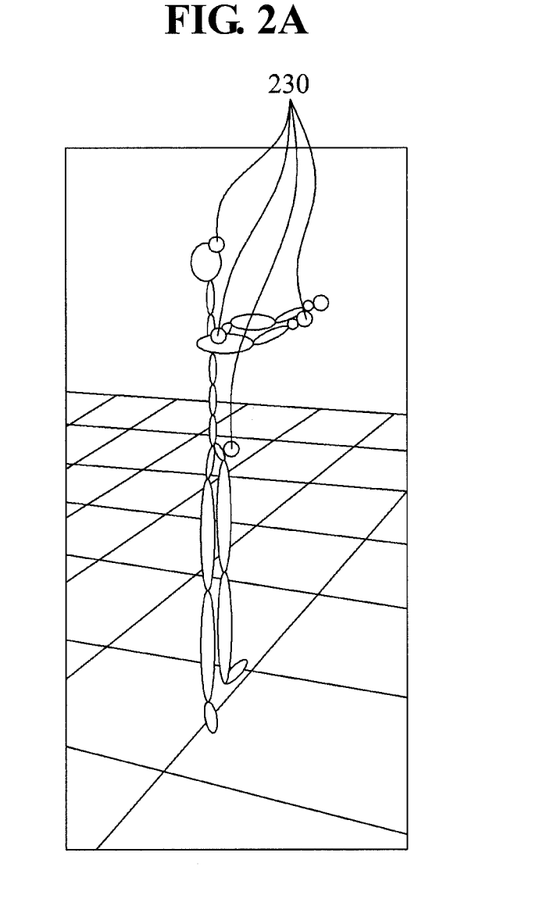
FIGS. 2A and 2B illustrate diagrams showing a target user taking a reference pose, the target user being attached with sensors, and an avatar created according to the reference pose, according to one or more embodiments.
Figure 2B:
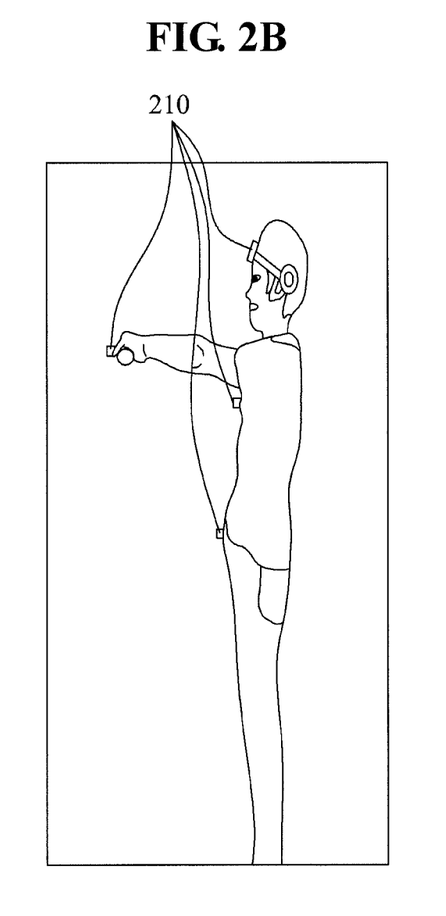

FIGS. 2A and 2B illustrate diagrams showing a target user taking a reference pose, the target user being attached with sensors, and an avatar created according to the reference pose, according to one or more embodiments.

Specifically, FIG. 2A shows the avatar created in the 3D space corresponding to the reference pose and FIG. 2B shows the target user taking the reference pose, being attached with the sensors 210. The avatar of FIG. 2A denotes the corresponding locations of the sensors 210 of the target user using reference numeral 230.

In FIG. 2A, a position of the avatar created in the 3D space may be determined by the joint angles of the joints corresponding to the reference poses, in accordance with the forward kinematics function.

As described above, the sensors may be provided at five positions on the target user to minimize the used number of sensors for creating the avatar. The five positions may include a forehead, both wrists, a chest, and a waist. However, the positions and the number of sensors may be adjusted as necessary.

Figure 3:
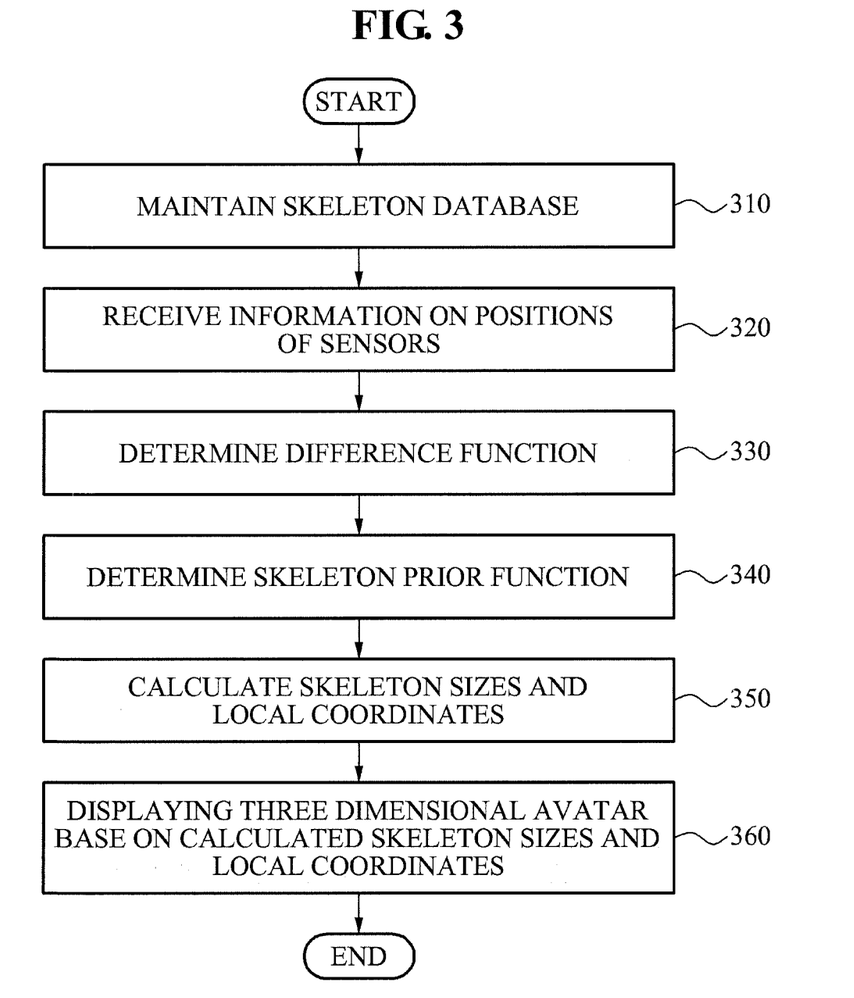
FIG. 3 illustrates a flowchart explaining a processing method for creating an avatar, according to one or more embodiments.

FIG. 3 illustrates a flowchart explaining a processing method for creating an avatar, according to one or more embodiments.

Referring to FIG. 3, the processing method maintains a skeleton database storing statistics of skeleton sizes with respect to reference poses of a plurality of users, in operation 310.

Here, information stored in the skeleton database may include the statistics of the skeleton sizes with respect to predetermined reference poses of the plurality of users taking the reference poses.

Prior to operation 310, the processing method may define the reference poses, and store the information including the statistics of the skeleton sizes with respect to the reference poses of the plurality of users in the skeleton database.

The processing method may receive information on positions of sensors attached to a target user, from the sensors, in operation 320.

In operation 330, the processing method may determine a difference function ($\|f(s, z; \tilde{q}_r) - \tilde{c}_r\|^2$) representing a difference between a forward kinematics function ($f(s, z; \tilde{q}_r)$) regarding joints of the avatar with respect to a reference pose of the target user and positions ($\tilde{c}_r$) of sensors attached to the target user.

In operation 340, additionally, the processing method determines a skeleton prior function $$\left(\left\|s - e_0 - \sum_{n=1}^{B} \lambda_n e_n\right\|\right)$$

based on the statistics of the skeleton sizes with respect to the reference poses of the plurality of users.

Here, the skeleton prior function may include a mean $e_0$, an eigen vector $e_n$, and an eigen value $\lambda_n$ calculated by applying the PCA scheme with respect to the statistics of the skeleton sizes.

In operation 350, the processing method calculates the skeleton sizes of the joints of the avatar and local coordinates corresponding to the sensors, using the difference function and the skeleton prior function.

In operation 350, the skeleton sizes and the local coordinates may be calculated to minimize a sum of the difference function and the skeleton prior function.

The functions may be understood by referring to the description with respect to FIG. 1.

According to one or more embodiments, an avatar with accurate motions may be created in consideration of variation in a figure of a target user, a sensor attachment position, and the like, by using a skeleton prior function based on the statistics of skeleton sizes of references poses of a plurality of users.

In addition, since the skeleton prior function containing a mean, an eigen vector, and an eigen value of the skeleton sizes is used, ambiguity in the skeleton size according to the user may be reduced.

The methods according to the above-described embodiments may be recorded in non-transitory computer-readable media including computer readable instructions to implement various operations by executing computer readable instructions to control one or more processors, which are part of a general purpose computer, computing device, a computer system, or a network. The media may also have recorded thereon, alone or in combination with the computer readable instructions, data files, data structures, and the like. The computer readable instructions recorded on the media may be those specially designed and constructed for the purposes of embodiments, or they may be of the kind well-known and available to those having skill in the computer software arts. The computer-readable media may also be embodied in at least one application specific integrated circuit (ASIC) or Field Programmable Gate Array (FPGA), which executes (processes like a processor) computer readable instructions. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The media may be transfer media such as optical lines, metal lines, or waveguides including a carrier wave for transmitting a signal designating the program command and the data construction. Examples of computer readable instructions include both machine code, such as produced by a compiler, and files containing higher level code that may be executed by the computer using an interpreter. The described hardware devices may be configured to act as one or more software modules in order to perform the operations of the above-described embodiments, or vice versa. Another example of media may also be a distributed network, so that the computer readable instructions are stored and executed in a distributed fashion.

Although embodiments have been shown and described, it would be appreciated by those skilled in the art that changes may be made in these embodiments without departing from the principles and spirit of the disclosure, the scope of which is defined in the claims and their equivalents.

What is claimed is:

1. A processing apparatus for creating an avatar, comprising:
   a skeleton database to store statistics of skeleton sizes with respect to reference poses of a plurality of users;
   a function determiner which determines a difference function representing a difference between a forward kinematics function, the forward kinematics function regarding joints of the avatar with respect to a reference pose of a target user, and positions of sensors attached to the target user, and to determine a skeleton prior function based on the statistics of the skeleton sizes with respect to the reference poses of the plurality of users, wherein the function determiner uses at least one processor;
   a calculator which calculates skeleton sizes of the joints of the avatar, and local coordinates corresponding to the sensors using at least one processor; and
   a display which displays the avatar based on the calculated skeleton sizes of the joints and the calculated local coordinates,
   wherein the skeleton database is updated periodically or non-periodically according to changes of the reference poses,
   wherein the calculator performs the calculation of skeleton sizes of the joints and local coordinates using the equation $$\operatorname{argmin}_{s,z,\lambda_n} \|f(s, z; \tilde{q}_t) - \tilde{c}_t\|^2 + \left\|s - e_0 - \sum_{n=1}^{B} \lambda_n e_n\right\|,$$

wherein, the difference function ($\|f(s, z; \tilde{q}_t) - \tilde{c}_t\|^2$) represents the difference between the forward kinematics function ($f(s, z; \tilde{q}_t)$), the forward kinematics function regarding the joints of the avatar with respect to the reference pose of the target user, and the positions ($\tilde{c}_t$) of the sensors attached to the target user, wherein s denotes the skeleton size of the reference pose of the target user, z denotes the local coordinate of the sensor, and $\tilde{q}_t$ denotes the joint angle with respect to the reference pose of the target user, and
   wherein $e_0$ denotes a mean, $e_n$ denotes an eigen vector, $\lambda_n$ denotes an eigen value calculated from the statistics of the skeleton sizes with respect to the reference poses of the plurality of users, and B denotes a number of main eigen vectors among the eigen vectors $e_n$ arranged in order of importance.

2. The processing apparatus of claim 1, wherein the skeleton prior function comprises a mean, an eigen vector, and an eigen value calculated from the statistics of the skeleton sizes with respect to the reference poses of the plurality of users.

3. The processing apparatus of claim 1, wherein the calculator calculates the skeleton sizes and the local coordinates to minimize a sum of the difference function and the skeleton prior function.

4. The processing apparatus of claim 1, further comprising a preprocessor which defines the reference pose and which stores information containing the statistics of the skeleton sizes of the reference poses of the plurality of users, in the skeleton database, wherein the preprocessor uses at least one processor.

5. The processing apparatus of claim 1, further comprising an interface which receives information on the positions of the sensors attached to the target user from the sensors, wherein the interface uses at least one processor.

6. A processing method for creating an avatar, comprising:
   maintaining a skeleton database storing statistics of skeleton sizes with respect to reference poses of a plurality of users;
   determining a difference function representing a difference between a forward kinematics function regarding joints of the avatar with respect to a reference pose of a target user and positions of sensors attached to the target user;
   determining a skeleton prior function based on the statistics of the skeleton sizes with respect to the reference poses of the plurality of users;
   calculating skeleton sizes of the joints of the avatar and local coordinates corresponding to the sensors, using the difference function and the skeleton prior function using at least one processor; and
   displaying the avatar based on the calculated sizes of the joints of the avatar and the calculated local coordinates,
   wherein the skeleton database is updated periodically or non-periodically according to changes of the reference poses,
   wherein the calculating of skeleton sizes of the joints and local coordinates uses the equation $$\operatorname{argmin}_{s,z,\lambda_n} \|f(s, z; \tilde{q}_t) - \tilde{c}_t\|^2 + \left\|s - e_0 - \sum_{n=1}^{B} \lambda_n e_n\right\|,$$

wherein, the difference function ($\|f(s, z; \tilde{q}_t) - \tilde{c}_t\|^2$) represents the difference between the forward kinematics function ($f(s, z; \tilde{q}_t)$), the forward kinematics function regarding the joints of the avatar with respect to the reference pose of the target user, and the positions ($\tilde{c}_t$) of the sensors attached to the target user,
   wherein s denotes the skeleton size of the reference pose of the target user, z denotes the local coordinate of the sensor, and $\tilde{q}_t$ denotes the joint angle with respect to the reference pose of the target user, and wherein $e_0$ denotes a mean, $e_n$ denotes an eigen vector, $\lambda_n$ denotes an eigen value calculated from the statistics of the skeleton sizes with respect to the reference poses of the plurality of users, and B denotes a number of main eigen vectors among the eigen vectors $e_n$ arranged in order of importance.

7. The processing method of claim 6, wherein the skeleton prior function comprises a mean, an eigen vector, and an eigen value calculated from the statistics of the skeleton sizes with respect to the reference poses of the plurality of users.

8. The processing method of claim 6, wherein the skeleton sizes and the local coordinates are calculated to minimize a sum of the difference function and the skeleton prior function.

9. The processing method of claim 6, further comprising:
defining the reference poses; and
storing information containing the statistics of the skeleton sizes with respect to the reference poses of the plurality of users, in the skeleton database.

10. The processing method of claim 6, further comprising receiving information on positions of the sensors attached to the target user from the sensors.

11. At least one non-transitory computer readable recording medium storing computer readable instructions to control at least one processor to implement the method of claim 6.

12. The processing apparatus of claim 1, wherein the stored skeleton sizes are updated periodically according to changes of the reference poses.

13. The processing apparatus of claim 1, wherein the stored skeleton sizes are updated non-periodically according to changes of the reference poses.

14. The processing apparatus of claim 1, wherein the sensors are provided at five positions consisting of the forehead, both wrists, a chest, and a waist.

15. A processing apparatus for creating an avatar, comprising:
a function determiner which determines a difference function representing a difference between a forward kinematics function, the forward kinematics function regarding joints of the avatar corresponding to a reference pose of a target user, and positions of sensors attached to the target user, and to determine a skeleton prior function based on statistics of skeleton sizes corresponding to reference poses of a plurality of users,
wherein the function determiner uses at least one processor;
a calculator which calculates skeleton sizes of the joints of the avatar, and local coordinates corresponding to the sensors using at least one processor; and
a display which displays the avatar based on the calculated skeleton sizes of the joints and the calculated local coordinates,
wherein the calculator performs the calculation of skeleton sizes of the joints and local coordinates using the equation $$\operatorname{argmin}_{s,z,\lambda_n} \|f(s, z; \tilde{q}_t) - \tilde{c}_t\|^2 + \left\| s - e_0 - \sum_{n=1}^{B} \lambda_n e_n \right\|,$$

wherein, the difference function ($\|f(s, z; \tilde{q}_t) - \tilde{c}_t\|^2$) represents the difference between the forward kinematics function ($f(s, z; \tilde{q}_t)$), the forward kinematics function regarding the joints of the avatar with respect to the reference pose of the target user, and the positions ($\tilde{c}_t$) of the sensors attached to the target user,
wherein s denotes the skeleton size of the reference pose of the target user, z denotes the local coordinate of the sensor, and $\tilde{q}_t$ denotes the joint angle with respect to the reference pose of the target user, and
wherein $e_0$ denotes a mean, $e_n$ denotes an eigen vector, $\lambda_n$ denotes an eigen value calculated from the statistics of the skeleton sizes with respect to the reference poses of the plurality of users, and B denotes a number of main eigen vectors among the eigen vectors $e_n$ arranged in order of importance.

16. The processing apparatus of claim 15, wherein the skeleton sizes and the local coordinates are calculated to minimize a sum of the difference function and the skeleton prior function.

17. A processing method for creating an avatar, comprising:
determining a difference function representing a difference between a forward kinematics function regarding joints of the avatar corresponding to a reference pose of a target user and positions of sensors attached to the target user;
determining a skeleton prior function based on statistics of skeleton sizes corresponding to reference poses of a plurality of users;
calculating skeleton sizes of the joints of the avatar and local coordinates corresponding to the sensors, using the difference function and the skeleton prior function using at least one processor; and
displaying the avatar based on the calculated sizes of the joints of the avatar and the calculated local coordinates,
wherein the calculating of skeleton sizes of the joints and local coordinates uses the equation $$\operatorname{argmin}_{s,z,\lambda_n} \|f(s, z; \tilde{q}_t) - \tilde{c}_t\|^2 + \left\| s - e_0 - \sum_{n=1}^{B} \lambda_n e_n \right\|.$$

wherein, the difference function ($\|f(s, z; \tilde{q}_t) - \tilde{c}_t\|^2$) represents the difference between the forward kinematics function ($f(s, z; \tilde{q}_t)$), the forward kinematics function regarding the joints of the avatar with respect to the reference pose of the target user, and the positions ($\tilde{c}_t$) of the sensors attached to the target user,
wherein s denotes the skeleton size of the reference pose of the target user, z denotes the local coordinate of the sensor, and $\tilde{q}_t$ denotes the joint angle with respect to the reference pose of the target user, and
wherein $e_0$ denotes a mean, $e_n$ denotes an eigen vector, $\lambda_n$ denotes an eigen value calculated from the statistics of the skeleton sizes with respect to the reference poses of the plurality of users, and B denotes a number of main eigen vectors among the eigen vectors $e_n$ arranged in order of importance.

18. The processing method of claim 17, wherein the skeleton sizes and the local coordinates are calculated to minimize a sum of the difference function and the skeleton prior function.

19. At least one non-transitory computer readable recording medium storing computer readable instructions to control at least one processor to implement the method of claim 17.

* * * * *